3,118,942
α-METHYL-IODOTHYRONAMINES

Henry A. Lardy and William T. Brady, Jr., Madison, Wis., assignors to Wisconsin Alumni Research Foundation, Madison, Wis., a corporation of Wisconsin
No Drawing. Filed Feb. 10, 1961, Ser. No. 88,278
3 Claims. (Cl. 260—570.8)

The present invention relates generally to novel iodo compounds and specifically to α-methyl-3,5,3'-triiodothyronamine and α-methylthyroxamine, and their process of preparation.

EXAMPLE I

N-Acetyl-4-Hydroxyamphetamine (I)

To a solution of 46.9 g. of 4-hydroxyamphetamine hydrobromide (0.202 mole) in 100 ml. of 2 N NaOH, were added, under vigorous stirring, 40 ml. of acetic anhydride and 440 ml. of 2 N NaOH in eight equal portions, the reaction temperature being kept below 5°. Upon completion of the reaction, the solution was acidified with HCl and the resulting ppt. was collected by suction and washed with a small amount of cold water. After it had been dried under vacuum, the product consisted of white crystals which melted at 158–160° (uncorr.). An analytical sample which was recrystallized from aqueous ethanol melted at 160.5–162.5° (corr.).

3,5-Dinitro-4-Hydroxy-N-Acetylamphetamine (II)

A solution of 20.0 g. of N-acetyl-4-hydroxyamphetamine (0.103 mole) in 40 ml. of glacial acetic acid and 110 ml. of conc. sulfuric acid (sp. gr.=1.84) was maintained at a temperature of —20° by the addition of solid $CO_2$ while 19.0 ml. of nitric acid (sp. gr.=1.41) was added dropwise under vigorous stirring. The reaction mixture was stirred at —10° for 30 minutes after all of the nitric acid had been added and then poured into a mixture of 500 g. of ice and 100 g. of solid $CO_2$. The volume was made up to about 1.5 l. with water and the product was allowed to crystallize at 5° for 18 hours. The resulting product, after recrystallization from a mixture of 190 ml. of ethanol and 285 ml. of water melted at 157–159° (uncorr.). An analytical sample which was recrystallized from aqueous ethanol melted at 159–160° (corr.).

O,α-Dimethyl-3,5,Dinitro-N-Acetylthyronamine (III)

A solution of 30.0 g. of II prepared as above and 22.6 g. of p-toluene-sulfonyl chloride (0.119 mole) in 90 ml. of pyridine was heated on a boiling water bath for 30 minutes, and was then heated under reflux with 38.4 g. of p-methoxyphenol (0.309 mole) for 1.5 hours. After cooling, the reaction mixture was poured into a mixture of 90 ml. of conc. HCl and 200 g. of crushed ice, and enough water was added to bring the volume to 1.5 l. The precipitated oil was stirred vigorously until it crystallized. The crystals were collected, dissolved in 1.5 l. of chloroform, and the chloroform layer was washed briefly with cold, 1% aqueous NaOH, with water, with cold 1% aqueous HCl, and again with water. Removal of the chloroform yielded yellow crystals which melted at 151–156°. Recrystallization from 200 ml. of ethanol yielded orange needles which melted at 155.2–156.0° (corr.).

O,α-Dimethyl-N-Acetyl-3,5-Diiodothyronamine (V)

A solution of 25.0 g. of III (0.0644 mole), prepared as described above, in 135 ml. of acetic acid was subjected to catalytic hydrogenation in the presence of 4.6 g. of 10% palladium on charcoal catalyst in a Parr hydrogenation apparatus until no more hydrogen was consumed. The initial pressure was about 3 atmospheres.
The following solutions were prepared:

Nitrosyl sulfuric acid solution:
Sodium nitrite, 10.9 g. (0.158 mole) was dissolved in 77 ml. of conc. $H_2SO_4$ (sp. gr.=1.84), the clear solution was cooled to 0°, and was carefully diluted with 154 ml. of acetic acid, the temperature being kept below 2°.

Iodide solution:
Fifty (50.0) g. of NaI (0.333 mole), 41.5 g. of $I_2$ (0.327 g. atom), and 6 g. of urea were dissolved in 800 ml. of water. To this solution was added 770 ml. of chloroform.

The acetic acid solution of the diamine (IV), resulting from the hydrogenation of the dinitro product described above, was filtered free of catalyst, and the filtrate, which was handled under $CO_2$, was added dropwise, with stirring, to 77 ml. of conc. $H_2SO_4$, the temperature of the reaction mixture being kept below 15°. This latter solution was added dropwise to the nitrosyl sulfuric acid solution, the temperature of the reaction mixture being kept between 0° and 2°. The reaction mixture was stirred at 0° for 45 minutes after the last of the diamine sulfate solution had been added. The tetraazonium solution was then poured into the iodide solution while the chloroform and aqueous layers were mixed as thoroughly as possible by use of a vibro-stirrer. The reaction mixture was stirred for 10 minutes longer, and the chloroform layer was separated. The aqueous layer was extracted with about 300 ml. of chloroform, and the combined chloroform layers were washed with 300 ml. of saturated aqueous sodium metabisulfite, 600 ml. of water, with a solution of 60 g. of potassium carbonate in 300 ml. of water, and again with water. Removal of the chloroform yielded brown crystals, which, upon recrystallization from a mixture of 135 ml. of acetic acid and 108 ml. of water yielded tan crystals which melted at 175–176° (uncorr.). A second recrystallization from a mixture of 150 ml. of acetic acid and 150 ml. of water yielded yellow crystals which melted at 176–177° (uncorr.); a third recrystallization from a mixture of 150 ml. of acetic acid and 100 ml. of water yielded pale yellow crystals which melted at 176–178° (uncorr.).

The yellow crystals were dissolved in 1200 ml. of dry benzene, and the benzene solution was poured through a column of activated alumina. All colored material was adsorbed by the alumina. A solution containing 1% (by volume) of methanol in benzene was then allowed to pass through the column until the colored band reached the bottom of the column. The colorless effluents were combined and concentrated to dryness, yielding white needles which melted at 176.0–176.8° (corr.).

All material was eluted from the column with 1 l. of pure methanol, and the methanol was removed over a water bath. The residue was redissolved in benzene and again evaporated to dryness to remove any traces of methanol. The residue was dissolved in 400 ml. of benzene and the solution was passed through a column of alumina 2 cm. high by 2.3 cm. in diameter. After an additional 200 ml. of benzene had passed through the column, the combined solutions were concentrated to dryness to yield additional white needles which also melted at 176.0–176.4° (corr.).

α-Methyl-N-Acetyl-3,5-Diiodothyronamine (VI)

A solution of 5.0 g. of V (0.00907 mole), prepared as described above, in 15 ml. of acetic acid and 10 ml. of conc. HI (sp. gr.=1.7) was heated under reflux for 1 hour and then gradually diluted with 75 ml. of water. The yellow, crystalline precipitate which was formed weighed 5.0 g. A portion, 9.7 g., of V was treated in a similar manner to yield 10.4 g. of yellow crystals. The total crude yield (15.4 g.) was dissolved in 150 ml. of boiling methanol and the hot solution was diluted with 150 ml. of hot water. After the resulting crystals had been kept in contact with the supernatant solution at 5° for several hours, they were collected in the usual way and, after drying under vacuum, melted at 213–214° (corr.).

*α-Methyl-3,5-Diiodothyronamine (VII) Hydrochloride*

A solution of 5.6 g. of VI (0.0104 mole), prepared as described above, in 560 g. of 10% aqueous NaOH was heated under reflux for 4 hours, cooled, and acidified with HCl. After the resulting gummy ppt. had been allowed to crystallize at room temperature for 24 hours and at 5° for 8 hours, a yield of tan crystals which melted at 150–180° was obtained. The crystals were dissolved in 40 ml. of methanol, the solution was filtered free of a small amount of insoluble matter, and the filtrate was mixed with 450 ml. of ethyl acetate. The solution was subjected to distillation at atmospheric pressure until 320 ml. of distillate had been collected. The white crystals which formed in the distilling flask were allowed to stand in contact with the mother liquor for 3 days, collected by suction, and, after drying under vacuum, melted at 265°. An analytical sample which was recrystallized in the same way, melted with decomposition at 268° (corr.).

A small amount of the free amine was prepared by adding aqueous ammonia to an ethanol solution of the VII hydrochloride. The compound was obtained in the form of white needles which, after storage under high vacuum over $P_2O_5$, melted at 225–226° (corr.).

*α-Methyl-3,5,3′-Triiodothyronamine (VIII) Hydrochloride*

To a solution of 1.00 g. of VII·HCl (0.00188 mole), prepared as described above, in 650 ml. methanol and 50 ml. of conc. aqueous $NH_3$ was added, dropwise, under stirring, 3.73 ml. of 0.998 N iodine in aqueous KI (0.00372 equivalent of iodine), the temperature of the reaction mixture being kept below 5°. The originally yellow solution, which had become colorless upon standing at 5° overnight, was filtered free of a small amount of insoluble matter and concentrated almost to dryness under vacuum. The solid residue was made into a slurry with 120 ml. of methanol and 100 ml. of aqueous $NH_3$, allowed to stand at 5° for several hours, and the crystals were collected and washed. The crystals were then dissolved in about 50 ml. of hot ethanol to which 1 ml. of conc. HCl had been added. When the solution was kept at 5° for several days, slightly yellow crystals which melted with decomposition at about 245° were deposited. The mother liquor was made alkaline with conc. aqueous $NH_3$, and, when concentrated nearly to dryness under vacuum, yielded slightly gray crystals. The melting point of the compound ranged from about 175° to 190°, depending on the rate of heating. The crystals were dissolved in about 90 ml. of boiling absolute ethanol, and a small amount of insoluble matter was removed by filtration of the hot solution. Upon cooling the solution to 5°, light tan needles were deposited. The mother liquor was concentrated to a volume of 25 ml. by distillation at atmospheric pressure; upon cooling, light tan needles were deposited. This procedure of recrystallizing the compound from ethanol and then concentrating the mother liquor to obtain a second crop of crystals was repeated five times to yield reasonably pure VIII. Finally, 0.28 g. of pure amine was dissolved in 15 ml. of acetic acid, the solution was stirred for 10 min. with 0.1 g. of activated carbon (Norite A) and after removal of the Norite, the colorless filtrate was treated with 0.1 ml. of conc. HCl. The acetic acid was removed under vacuum, and the white crystalline VIII·HCl residue was washed with a small amount of ethyl acetate, dried under vacuum over NaOH, and then dried for several hours at 78° under high vacuum over BaO. The yield was 0.25 g. (86% recovery) of white crystals which melted with decomposition at about 250° (rapid heating).

EXAMPLE II

*α-Methylthyroxamine (IX) HCl*

One (1.00) g. of VII·HCl (0.00188 mole), prepared as described above, was iodinated by the same procedure used for the preparation of the triiodo derivative (VIII) except that 7.55 ml. of 0.998 N iodine in aqueous KI (0.00752 equivalent of iodine) was used instead of 3.73 ml. After the reaction mixture had been allowed to stand at 5° for about one week, it was concentrated nearly to dryness under vacuum to yield tan crystals. The free amine, which is almost completely insoluble in alcohol, was recrystallized by dissolving it in methanol containing a small amount of HCl and reprecipitating the amine with aqueous ammonia. This process was repeated twice. Finally, the free amine was dissolved in acetic acid, treated with activated carbon (Norite A) and after removal of the Norite, the filtrate was treated with a small amount of HCl. The acetic acid was concentrated to a volume of about 5 ml. under vacuum, and the crystals which formed were collected by suction, washed with a little acetic acid, and dried under high vacuum over NaOH. The final yield of pure product consisted of white crystals which melted with decomposition at about 260° (rapid heating).

The compounds of the present invention are related to thyroxine, i.e. 3,5,3′,5′-tetraiodothyronine. The tetraiodo compound, α-methylthyroxamine, differs from thyroxine in that it contains a methyl group in place of the carboxyl group present in the side chain of thyroxine, while the triiodo compound, α - methyl-3,5,3′-triiodothyronamine, corresponds to α-methylthyroxamine, except for the presence of the additional iodine substituent at the 5′-position of the tetraiodo substituted, α-methylthyroxamine. The compounds of the present invention are characterized by thyroxine activity (about 1/100 as active as L thyroxine) in that they have a stimulating effect on metabolism. In addition to use in this field where reduced activity is desired, the compounds of the present invention can be used for studying effects of thyroxine in experimental animals under conditions which preclude the conversion of thyroxine to more active forms of this hormone.

We claim:
1. Compounds selected from the group consisting of α-methyl-3,5,3′-triiodothyronamine and α-methylthyroxamine.
2. α-Methyl-3,5,3′-triiodothyronamine.
3. α-Methylthyroxamine.

References Cited in the file of this patent

Tomita et al.: "Chem. Abs.," vol. 50, page 13794 (1 page) (1956).